Nov. 1, 1960  R. J. SIMPSON ET AL  2,958,720
CAPACITOR END SEAL
Filed March 25, 1955
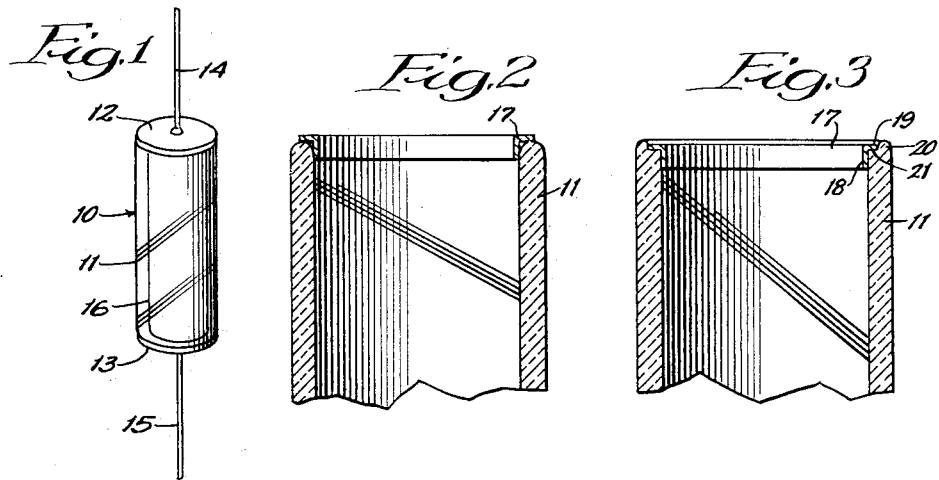
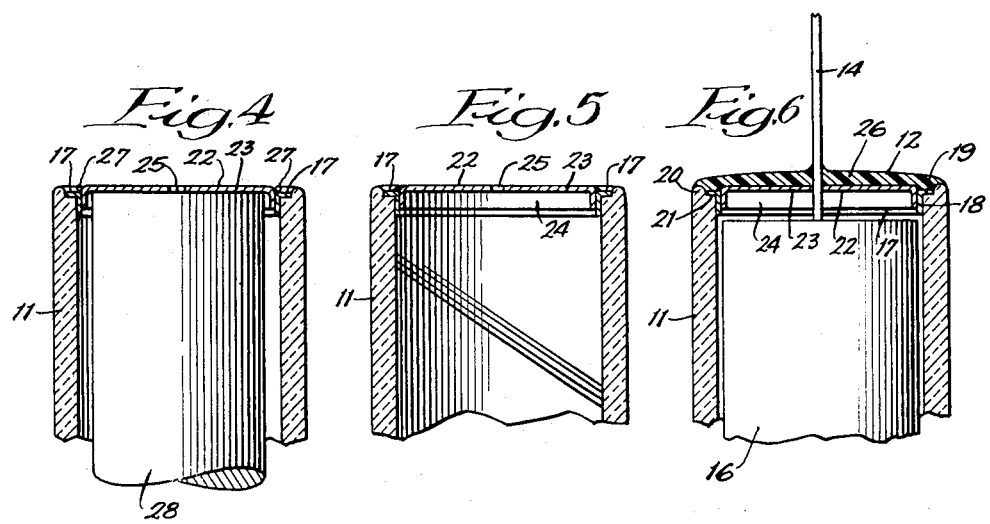
INVENTORS
RAYMOND J. SIMPSON
BENJAMIN S. NAVEN
BY
Dawson, Tilton & Graham
ATTORNEYS.

United States Patent Office 2,958,720
Patented Nov. 1, 1960

2,958,720

CAPACITOR END SEAL

Raymond J. Simpson, River Forest, and Benjamin S. Naven, Chicago, Ill., assignors, by mesne assignments, to Dearborn Electronic Laboratories of Delaware, Inc., Orlando, Fla., a corporation of Delaware Filed Mar. 25, 1955, Ser. No. 496,655

1 Claim. (Cl. 174—50.62)

This invention relates to capacitors, and more particularly to high voltage capacitors especially adapted for use at high altitudes.

It is well known that when the electric stress at the surface of a conductor exceeds a certain value, there is an air breakdown resulting in a phenomenon known as corona. In rarified atmospheres such as those present at high altitudes, the problem of corona is seriously amplified for several reasons. First, corona appears at much smaller working voltages, and secondly, the problem of flashover, or the shorting across between corona areas of adjacent conductors is very likely to be present. It is also known that corona losses are more prevalent along sharp edges or pointed ends of a conductor, as for example, the edge portion of a plate in contrast to the large surface of the plate body.

Applying these principles to capacitors, it is found that at high altitudes corona losses tend to appear at opposite ends of the capacitor, or at opposite terminals thereof, and if the capacitors are relatively short so that the opposite terminals are fairly close together breakdown and flashover between the terminals appears. It will be appreciated that while this problem might be overcome by lengthening the capacitors so as to space the terminals apart by a considerable distance, such a solution is not desirable; and though flashover might be prevented, corona would still appear at the capacitor terminals. There is a need, then, for an improved means for overcoming these problems.

It is, accordingly, an object of this invention to provide a high voltage capacitor especially suited for use at high altitudes, and wherein the problems of the corona phenomenon and flashover are substantially obviated. Another object of the invention is to provide a capacitor of the character described in which sharp edged conductive surfaces are mounted in an unusual manner so as to conceal the sharp edges and thereby minimize the corona problem.

Still another object is in the provision of a capacitor having a casing formed of an insulating material that is preferably glass, and which has bonded to the opposite open ends of the glass a sharp edged grommet with the sharp edges thereof recessed into the glass, and caps being secured to the grommet and providing openings therethrough that receive the lead wires of the capacitor electrodes, the entire end portions of the containers being preferably coated with an insulating plastic material. A further object of the invention is to provide a high voltage capacitor useful in rarified atmospheres, and that is relatively small in size and light in weight, and that provides a casing substantially sealing the capacitor electrodes therein, whereby humid conditions and fungus growths do not affect the capacitors. Still a further object is in the provision of a novel method of assembling a capacitor having the characteristics described. Additional objects and advantages will appear as the specification proceeds.

An embodiment of the invention is illustrated in the accompanying drawing, in which—

Figure 1 is a perspective view of a capacitor formed in accordance with the invention; Figure 2 is a broken longitudinal sectional view showing one step in the making of the capacitor; Figure 3 is a broken longitudinal sectional view showing the capacitor after another step in its formation; Figures 4 and 5 are broken longitudinal sectional views showing subsequent steps in the making of the capacitor; and Figure 6 is a broken longitudinal sectional view showing a completed capacitor with the electrodes and lead wires in place.

Figure 1 illustrates a capacitor 10 comprising a casing 11 having end caps 12 and 13, and lead wires or leads 14 and 15 extending outwardly therefrom. The lead wires 14 and 15 are connected respectively to the electrodes or plates that provide the actual capacitance of the unit, and which may be completely conventional and consist of a pair of electrode elements separated by insulating material such as impregnated paper, and which are then coiled upon themselves to form the tubular or cylindrical structure designated generally with the numeral 16.

The casing 11 is generally cylindrical with ends lying in parallel planes and may be formed from a suitable insulating material such as glass, as is shown in the drawing. The casing 11 is open at each end and has a tubular chamber extending therethrough and that receives the plate or electrode elements 16.

The open ends of the casing 11 are closed by the structure that is seen best in Figure 6. Snugly received within the open end portions of the casing 11 is a grommet 17 having a circumferential wall 18 and an annular flange 19 extending laterally outwardly therefrom. The grommet is bonded to the casing 11 so as to be rigid with respect thereto. Preferably, the grommets 17 are formed from Kovar metal which is a combination of steel, cobalt, manganese and nickel, and which, having substantially the same temperature-expansion coefficient as glass, is particularly suited for glass-to-metal bonding. It is seen in Figure 6 that the flange 19 is recessed into the casing 11, and that the casing is provided with a lip 20 that extends upwardly or outwardly beyond the flange 19, and with a shoulder portion 21 that provides a seat for the flange 19.

Received within the grommet 17 and providing a closure for the open ends of the casing 17, is a cap 22 having a substantially planar top surface 23 and a depending annular flange 24 that extends into the annular opening defined by the wall 18 of the grommet 17. Preferably, a snug fit is provided between the wall 18 and the flange 24. The cap 22 is rigidly secured to the grommet 17 by solder or other suitable means in a manner that will be described hereinafter.

The cap 22 is provided centrally with an opening or aperture 25 therethrough, through which the lead wire 14 projects, as is shown in Figure 6. After the structure has been assembled with the grommets 17 and caps 22 in place on each end of the casing 11, and with the electrode members 16 within the casing and the lead wires 14 and 15 extending outwardly through the end caps, the ends of the casing are then covered with a coating material 26 that may be applied in any convenient manner and, for example, may be brushed onto the ends of the casing. The particular material selected should have good electrical properties, and specifically should provide a good insulation, it should have good dielectric properties, and it should be corona resistant. A number of materials are available that satisfy these requirements, and several of the plastics have been found suitable—for example, an epoxy resin may be employed. Most desirably, the insulating material 26 completely covers the planar surface 23 of the cap 22, extends over the flange 19 of the grommet 17 and covers and tapers off over the lip 20 and adjacent the circumferential surface of the casing 11.

It has been found particularly desirable to form the capacitor 10 in the manner illustrated in the drawing and which will now be described. The electrodes and the lead-in wires 14 and 15 therefor may be formed by conventional means, and in any desired manner insofar as this invention is concerned. The casing 11 will comprise a glass tube that will be cut into appropriate lengths so as to satisfy the lengths of the particular electrodes 16 that will be received within the hollow compartment thereof. The casing members 11 may be cut to desired lengths in any suitable manner and, as is conventional, will undoubtedly be sawed to proper lengths. It may then be desired to prebraze the end portions of the casing member 11 to remove the saw tooth marks and rough portions thereof.

Thereafter, the grommet 17 is placed in position at the end of the casing 11, as is shown in Figure 2. Following this step, the casing 11 with the grommet 17 in place is heated to a temperature such that the glass in contact with the flange 19 flows to form the recess in which the flange is seated. At the same time, the application of heat fuses the grommet 17 to the container 11. While the heat may be applied in various ways, we prefer to subject the casing and the grommet to radio frequency energy and heat the container in that manner. After cooling, it is found that the grommet is fused to the glass container, and that the lip 20 projects outwardly beyond the surface of the flange 19.

The next step is to place the cap 22 in the position shown in Figure 4, wherein the depending flange 24 frictionally engages the inner surface of the annular wall 18 provided by the grommet. The frictional fit between these two members maintains the cap 22 in the position shown in Figure 4. Next, a preformed solder ring 27, as is shown in Figure 4, is fitted about that portion of the cap 22 that projects outwardly beyond the surface of the flange 19. Heat is then applied to melt the solder ring 27 and thereby fuse the steel cap 22 to the grommet 17. We have found it convenient to melt the solder 17 by application of R.F. energy thereto.

While a relatively tight frictional fit is provided between the depending flange of the cap 22 and the depending wall of the grommet 17, it has been found convenient in positioning the cap within the grommet to provide a post 28, as is shown in Figure 4, that extends through the casing 11 and through the grommet 17, and that is adapted to be received within the depending flange 24 of the cap member. The cap rests on the upper surface of the post 28 and accurately positions the cap relative to the grommet 17. The post 28 may remain in place until the soldering 27 has been melted to fuse or "sweat" the cap and grommet together, as is shown in Figure 5.

Following the capping of one end of the casing 11, the capacitor electrode assembly 16 is placed within the casing and the lead wire 14 is projected outwardly through the aperture 25 in the wall of the cap. The lead wire 14 is then rigidly secured to the cap in any suitable manner and, for example, a drop of solder may be placed about the wire and cap in the area of the aperture 22, and when heat is applied to the solder it is effective to bond the wire to the cap. The cap for the opposite end of the casing 11 is then bonded or fused to the grommet at that end in the same manner that has been described in detail.

It is possible to use the capacitor as a circuit element at this point, and in operation or in use such capacitors have been found to be highly satisfactory. However, it is preferred to cover the end portions of the capacitor, and particularly the exposed surfaces of the cap 22 and grommet 17, with the insulating layer 26. This material is preferably in fluid form and is brushed onto the end portions of the capacitor to provide a covering thereabout, as is shown in Figure 6. The plastic layer 26 may be cured in any conventional manner.

Some variation may be permissible in the precise positioning of the grommet relative to the casing, and in the positioning of the end caps relative to the grommets. It has been found, however, that satisfactory results are obtained when the grommet is recessed through the end of the casing so that the lip 20 extends outwardly about $1/64$ of an inch beyond the outer surface of the grommet flange 19. The cap is then positioned so that the outer surface thereof is about $1/32$ of an inch above the outer surface of the grommet flange 19, or about $1/64$ of an inch beyond the lip 20. In other words, the flat portion of the end cap is, as shown in the drawing, substantially flush with the lip of the cylindrical container.

Tests have been made of the capacitors formed in accordance with the invention, and such tests show that the capacitors may be subjected to relatively high working voltages for extended periods in rarified atmospheres without appearance of the corona effect. The test results show marked improvement over conventional capacitors now in use, and for convenience portions of the test results will be set forth below. Tests have been made with the end caps of the capacitors uncoated, and tests have also been made where the end caps have been covered with an insulating material. In the specific test results that will follow, the end caps were covered with a Pliobond coating.

| Casing dimensions, width and length, inches | $17/32$ x $1\frac{3}{4}$ | $17/32$ x $1\frac{9}{16}$ | $3/4$ x $1\frac{3}{4}$ | $1$ x $2\frac{1}{4}$ | $1\frac{1}{2}$ x $3\frac{1}{2}$ | $1\frac{1}{32}$ x $4\frac{1}{4}$ |
|---|---|---|---|---|---|---|
| Test Alt. (ft.) | D.C. Test Voltages without Corona | | | | | |
| Uncoated Ends: | | | | | | |
| 70,000 | 1,200 | 1,900 | 2,250 | 1,900 | 2,200 | 3,500 |
| 60,000 | 2,500 | 3,200 | 3,500 | 3,000 | 4,500 | 5,000 |
| 50,000 | 4,500 | 4,500 | 6,000 | 5,000 | 7,000 | 8,000 |
| 30,000 | 9,500 | 13,000 | 13,000 | 11,000 | 12,000 | 15,000 |
| Pliobond Coated Ends: | | | | | | |
| 60,000 | 5,000 | 6,500 | 6,000 | 6,000 | 6,500 | 7,000 |
| 50,000 | 6,500 | 7,800 | 7,900 | 7,000 | 9,000 | 10,000 |
| 25,000 | [1] 15,000 | [1] 20,000 | 18,000 | 16,000 | [1] 20,000 | 20,000 |

[1] Not measured above these values.

It will be apparent particularly from the chart set out above that the capacitors are relatively small, and then are particularly suited for use in aircraft and elsewhere wherein size and weight limitations are critical. Further, the electrodes of the capacitors are sealed within the glass casing and are thereby insulated from humidity conditions and are substantially impervious to fungus growth and development. Further, the high working voltages than can be accommodated at high altitudes without the appearance of corona makes the capacitors an important contribution to the art.

The resistance of the illustrated construction to formation of corona is believed due largely to the lack of any exposed sharp edges capable of setting up regions of high potential gradient. Thus, as shown in the drawings, all of the sharp edges are glass-embedded so that only extended surfaces, as such, are exposed to the atmosphere.

While in the foregoing specification embodiments of the invention have been set forth, both as to structure and method of forming, in considerable detail for purposes of adequately illustrating the invention, it will be apparent to those skilled in the art that numerous changes may be made in the details of the structure and details of the method without departing from the spirit and principles of the invention.

We claim:

In a capacitor structure adapted for use at relatively high altitudes the combination comprising a glass cylinder having ends lying in parallel planes, a metal grommet having a cylindrical wall of short axial length dimensioned to fit into the end of said glass cylinder, said grommet further having a radial flange of a width which is less than the wall thickness of the cylinder, said grommet being recessed into the end of the cylinder so that the glass of the cylinder forms a peripheral lip surrounding the outer edge of the grommet, the wall portion and flange of the grommet having a glass-to-metal seal with the glass cylinder over its entire glass-abutting area and having a temperature coefficient of expansion which is substantially the same as glass, a circular end cap having a substantially flat surface and a peripheral skirt portion depending therefrom, said skirt portion being dimensioned for snug reception within the wall of the grommet, said end cap being recessed into the grommet so that its central portion is substantially flush with the lip of the glass cylinder, substantially the entire presented area of the skirt portion of the end cap being soldered to the wall of the grommet, a capacitor occupying substantially the entire space within the glass cylinder and having a lead secured to the end cap and projecting axially therefrom, and a layer of insulating material having good electric and corona resisting properties completely covering the flat surfaces of said end cap, extending over the radial flange of said grommet and covering the peripheral lip surrounding the outer edge of said grommet and adjacent the cylindrical surface of said cylinder.

References Cited in the file of this patent

UNITED STATES PATENTS

| | | |
|---|---|---|
| 908,814 | Stone | Jan. 5, 1909 |
| 1,331,091 | Becker | Feb. 17, 1920 |
| 1,727,755 | Dickinson | Sept. 10, 1929 |
| 2,251,540 | Buschbeck et al. | Aug. 5, 1941 |
| 2,305,901 | Scharfnagel | Dec. 22, 1942 |
| 2,383,973 | Jones | Sept. 4, 1945 |
| 2,626,985 | Gates | Jan. 27, 1953 |
| 2,664,455 | Williamson | Dec. 29, 1953 |
| 2,665,329 | Brennan | Jan. 5, 1954 |

FOREIGN PATENTS

| | | |
|---|---|---|
| 506,024 | Great Britain | May 22, 1939 |
| 521,604 | Great Britain | May 27, 1940 |
| 560,977 | Great Britain | Apr. 28, 1944 |
| 140,199 | Australia | Feb. 12, 1951 |